(12) United States Patent
Richman

(10) Patent No.: US 9,321,330 B2
(45) Date of Patent: Apr. 26, 2016

(54) SUN SHADE ASSEMBLY

(71) Applicant: Jack Richman, West Palm Beach, FL (US)

(72) Inventor: Jack Richman, West Palm Beach, FL (US)

( * ) Notice: Subject to any disclaimer, the term of this patent is extended or adjusted under 35 U.S.C. 154(b) by 0 days.

(21) Appl. No.: 14/471,173

(22) Filed: Aug. 28, 2014

(65) Prior Publication Data
US 2016/0059676 A1    Mar. 3, 2016

(51) Int. Cl.
*B60J 3/02*    (2006.01)

(52) U.S. Cl.
CPC .............. *B60J 3/0208* (2013.01); *B60J 3/0252* (2013.01)

(58) Field of Classification Search
CPC ...... B60J 3/0208; Y10S 160/03; B60R 11/02; B60R 5/047; B60R 11/00; B60R 2011/0014; B60R 2011/0028; B60R 2011/0061; B60R 2011/0075; B60R 7/05
USPC ................ 296/97.8, 97.9, 97.11, 97.6, 97.12, 296/97.13; 312/332, 334.1
See application file for complete search history.

(56) References Cited

U.S. PATENT DOCUMENTS

| | | | |
|---|---|---|---|
| 4,666,205 A | 5/1987 | Nakagawa | |
| 4,681,363 A | 7/1987 | Hemmeke et al. | |
| 4,828,314 A | 5/1989 | Gavagan | |
| 4,913,483 A * | 4/1990 | Jasso | 296/97.6 |
| D338,183 S | 8/1993 | Spiwak | |
| 5,445,427 A * | 8/1995 | Vandagriff | 296/97.6 |
| 5,472,255 A * | 12/1995 | Moore | 296/97.6 |
| 5,580,117 A * | 12/1996 | Goclowski | 296/97.6 |
| 5,662,371 A | 9/1997 | Gera et al. | |
| 6,776,446 B1 | 8/2004 | Tutt | |
| 7,001,029 B1 * | 2/2006 | Lagana | 359/602 |
| 2006/0125277 A1* | 6/2006 | Maharaj | 296/97.8 |
| 2013/0082479 A1 | 4/2013 | Marcus et al. | |

FOREIGN PATENT DOCUMENTS

WO    WO2005065120    7/2005

* cited by examiner

*Primary Examiner* — Glenn Dayoan
*Assistant Examiner* — Sunsurraye Westbrook

(57) ABSTRACT

A sun shade assembly includes a first visor structured to have a front side and a back side. The first visor is movably coupled to a vehicle. The first visor is positionable in front of the driver of the vehicle the first visor may provide shade for the driver. A second visor is structured to have a forward side and a rearward side. The second visor is movably coupled to the first visor. The second visor is positionable beside the driver of the vehicle. The second visor may provide shade for the driver. A window is movably coupled to the first visor. The window is positionable in a stored position so the window is concealed within the first visor. The window is positionable in a deployed position so the window extends outwardly from the first visor. The window may provide additional shade for the driver.

8 Claims, 4 Drawing Sheets

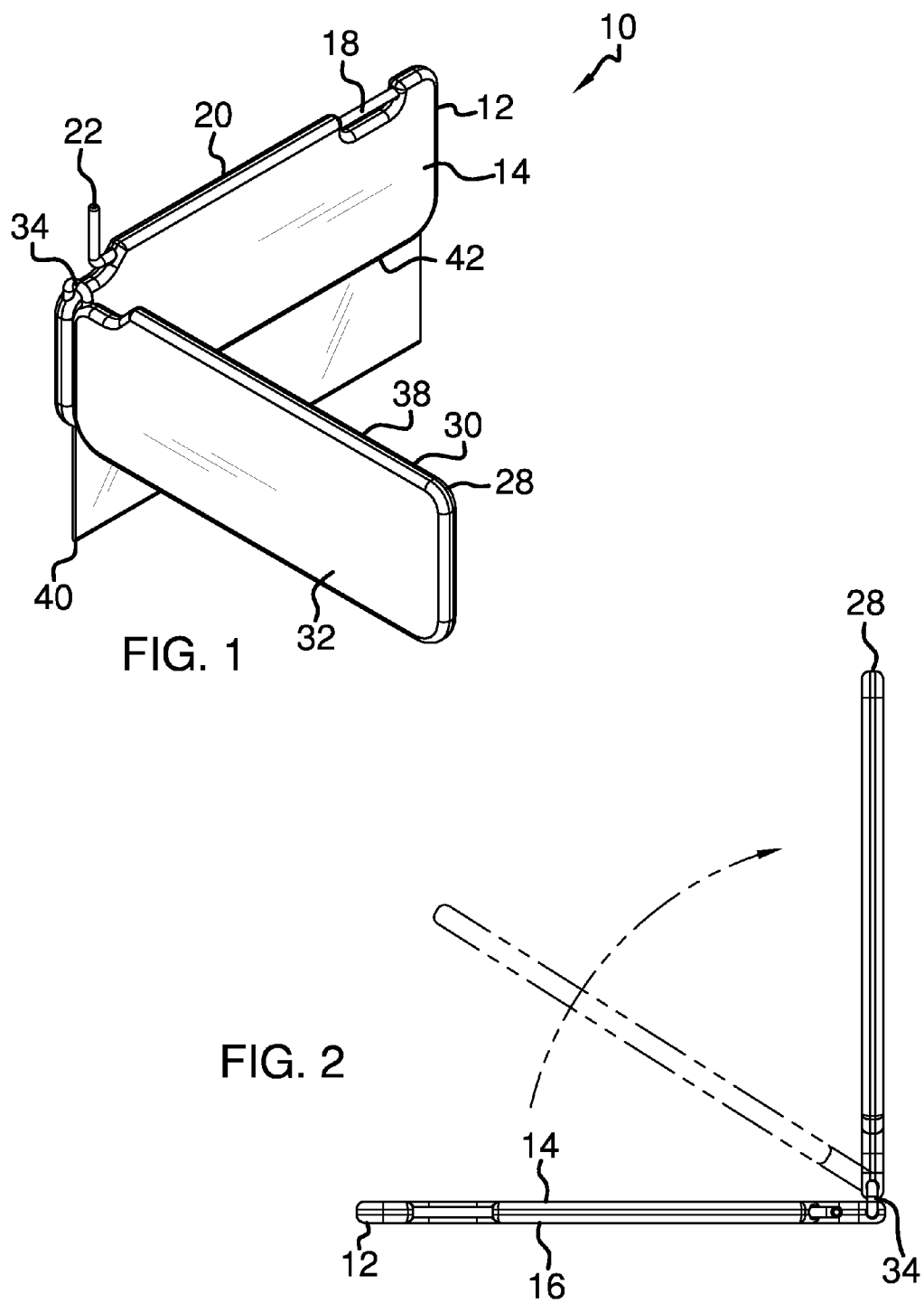

SUN SHADE ASSEMBLY

BACKGROUND OF THE DISCLOSURE

Field of the Disclosure

The disclosure relates to shade devices and more particularly pertains to a new shade device for providing shade for a driver of a vehicle.

SUMMARY OF THE DISCLOSURE

An embodiment of the disclosure meets the needs presented above by generally comprising a first visor structured to have a front side and a back side. The first visor is movably coupled to a vehicle. The first visor is positionable in front of a driver of the vehicle the first visor may provide shade for the driver. A second visor is structured to have a forward side and a rearward side. The second visor is movably coupled to the first visor. The second visor is positionable beside the driver of the vehicle. The second visor may provide shade for the driver. A window is movably coupled to the first visor. The window is positionable in a stored position so the window is concealed within the first visor. The window is positionable in a deployed position so the window extends outwardly from the first visor. The window may provide additional shade for the driver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a sun shade assembly according to an embodiment of the disclosure.

FIG. 2 is a top view of an embodiment of the disclosure.

DESCRIPTION OF THE PREFERRED EMBODIMENT

Figure 3:
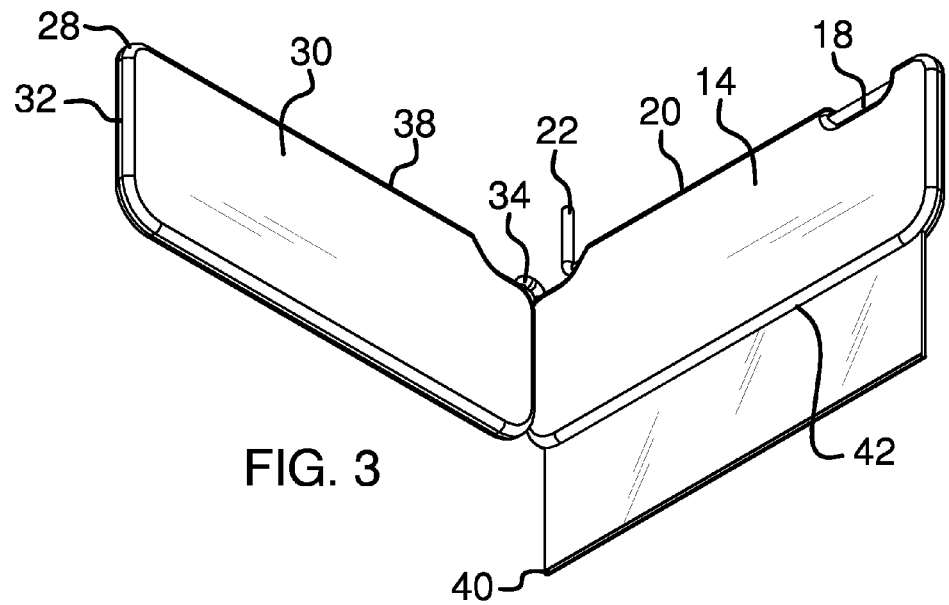
FIG. 3 is a bottom perspective view of an embodiment of the disclosure.
Figure 4:
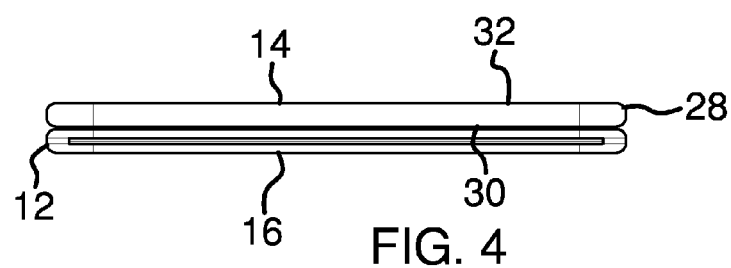
FIG. 4 is a bottom view of an embodiment of the disclosure.
Figure 5:
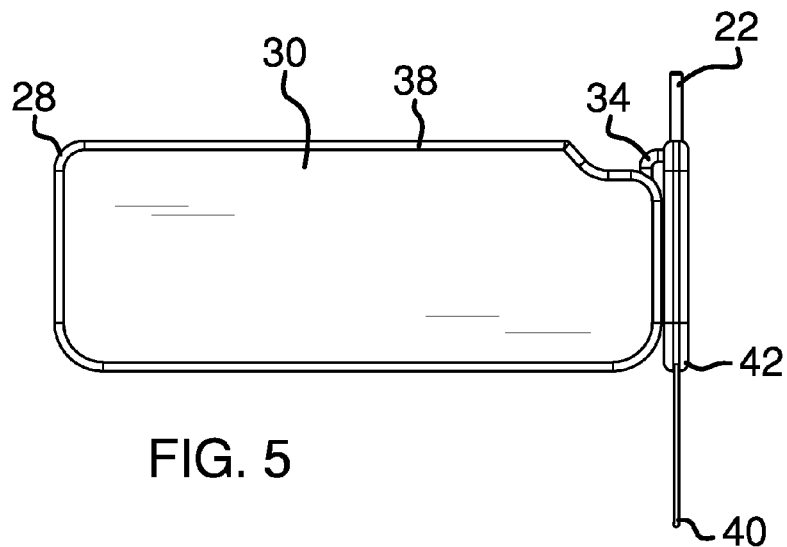
FIG. 5 is a right side view of an embodiment of the disclosure.
Figure 6:
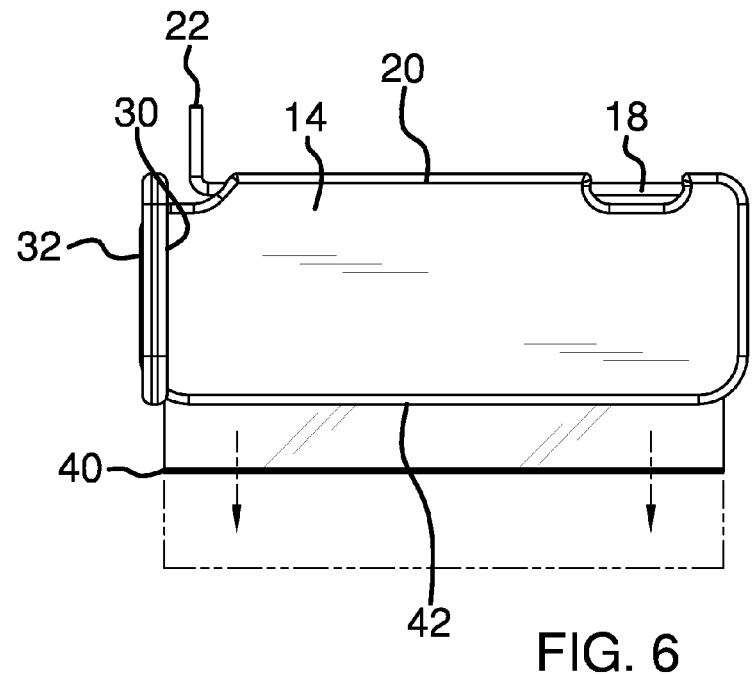
FIG. 6 is a front view of an embodiment of the disclosure.
Figure 7:
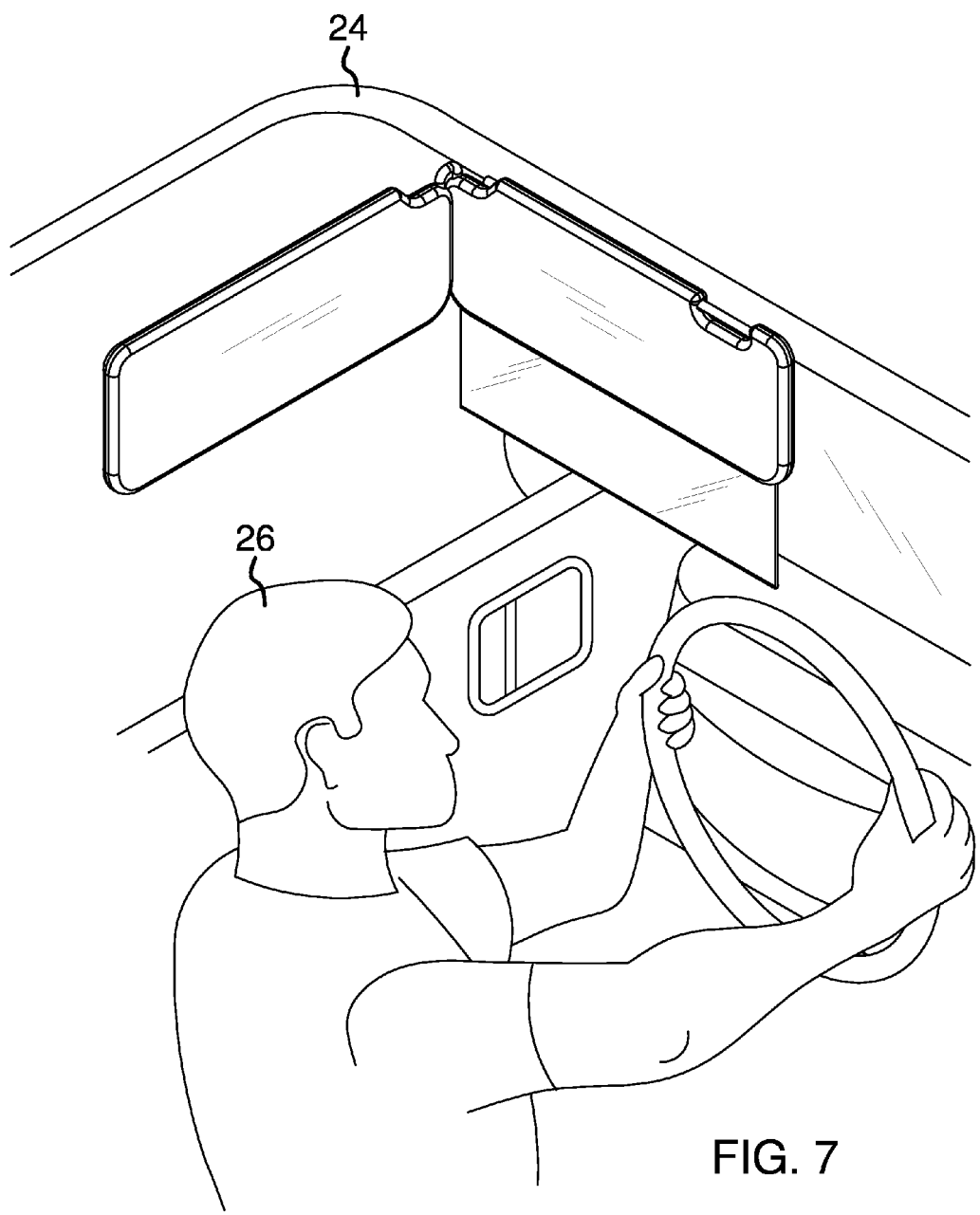
FIG. 7 is an in-use view of an embodiment of the disclosure.

With reference now to the drawings, and in particular to FIGS. 1 through 7 thereof, a new shade device embodying the principles and concepts of an embodiment of the disclosure and generally designated by the reference numeral 10 will be described.

As best illustrated in FIGS. 1 through 7, the sun shade assembly 10 generally comprises a first visor 12 structured to have a front side 14 and a back side 16. A rod 18 is provided. The rod 18 extends laterally through the first visor 12. Additionally, the rod 18 is positioned proximate to and is coextensive with a top edge 20 of the first visor 12. The first visor 12 is hingedly coupled to the rod 18.

The rod 18 is bent such that a first end 22 of the rod 18 is directed upwardly from the rod 18. The first end 22 of the first rod 18 is coupled to an interior of a vehicle 24. The vehicle 24 may be a passenger vehicle of any conventional design. The first visor 12 extends laterally in front of a driver 26 of the vehicle 24. Additionally, the first visor 12 is positionable in a stored position so the first visor 12 is removed from the driver's 26 line of sight. The first visor 12 is positionable in a deployed so the first visor 12 may provide shade for the driver 26.

A second visor 28 is structured to have a forward side 30 and a rearward side 32. A hinge 34 is coupled between the top edge 20 of the first visor 12 and an upper edge 38 of the second visor 28. The second visor 28 is hingedly coupled to the first visor 12. The second visor 28 is positionable in a stored position so the forward side 30 of the second visor 28 abuts the front side 14 of the first visor 12. Moreover, the second visor 28 is positionable in a deployed position so the forward side 30 of the second visor 28 lies on a plane that is perpendicular to the front side 14 of the first visor 12. The second visor 28 may provide shade for the driver 26.

A window 40 is provided. The window 40 is slidably coupled to the first visor 12. The window 40 is positionable in a stored position so the window 40 is concealed within the first visor 12. The window 40 is positionable in a deployed position so the window 40 extends downwardly from a bottom edge 42 of the first visor 12. The window 40 may provide additional shade for the driver 26. Finally, the window 40 is coextensive with the bottom edge 42 of the first visor 12.

The window 40 may be comprised of a translucent material. The window 40 is additionally tinted. The window 40 reduces an amount of sun light directed toward the driver 26.

In use, the first visor 12 in positioned in the deployed position to provide shade in the driver's 26 line of sight. The second visor 28 is positionable in the deployed position if the driver 26 needs shade from the side. The window 40 is deployed if the driver 26 needs additional protection from sun light when the first visor 12 is in the deployed position. The window 40 may be deployed regardless of the positioning of the second visor 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sun shade assembly comprising:
    a first visor structured to have a front side and a back side, said first visor being movably coupled to a vehicle, said first visor being positionable in front of a driver of the vehicle such that said first visor is configured to provide shade for the driver;
    a second visor being structured to have a forward side and a rearward side, said second visor being movably coupled to said first visor, said second visor being positionable beside the driver of the vehicle such that said second visor is configured to provide shade for the driver;
    a hinge coupled between a top edge of said first visor and an upper edge of said second visor such that said second visor is hingedly coupled to said first visor, said hinge having an arcuate section, said arcuate section having downwardly extending ends, each of said downwardly extending ends of said arcuate section being coupled to an associated one of said first visor and said second visor such that said second visor is pivotable relative to said first visor wherein an edge of said second visor remains in contact with said first visor as said second visor is pivoted; and
    a window movably coupled to said first visor, said window being positionable in a stored position such that said window is concealed within said first visor, said window being positionable in a deployed position such that said window extends outwardly from said first visor wherein said window is configured to provide additional shade for the driver.

2. The sun shade assembly according to claim 1, further comprising a rod extending laterally through said first visor such that said rod is positioned proximate to and is coextensive with a top edge of said first visor, said first visor being hingedly coupled to said rod.

3. The sun shade assembly according to claim 2, further comprising said rod being bent such that a first end of said rod is directed upwardly from said rod.

4. The sun shade assembly according to claim 3, further comprising said first end of said first rod being coupled to the vehicle such that said first visor extends laterally in front of the driver.

5. The sun shade assembly according to claim 4, further comprising said second visor being positionable in a stored position such that said forward side of said second visor abuts said front side of said first visor.

6. The sun shade assembly according to claim 5, further comprising said second visor being positionable in a deployed position such that said forward side of said second visor lies on a plane being perpendicular to said front side of said first visor.

7. The sun shade assembly according to claim 1, further comprising said window being slidably coupled to said first visor such that said window is extendable downwardly from a bottom edge of said first visor.

8. A sun shade assembly comprising:
    a first visor structured to have a front side and a back side;
    a rod extending laterally through said first visor such that said rod is positioned proximate to and is coextensive with a top edge of said first visor, said first visor being hingedly coupled to said rod, said rod being bent such that a first end of said rod is directed upwardly from said rod, said first end of said first rod being coupled to the vehicle, said first visor extending laterally in front of the driver such that said first visor is configured to provide shade for the driver;
    a second visor being structured to have a forward side and a rearward side;
    a hinge coupled between a top edge of said first visor and an upper edge of said second visor such that said second visor is hingedly coupled to said first visor, said hinge having an arcuate section, said arcuate section having downwardly extending ends, each of said downwardly extending ends of said arcuate section being coupled to an associated one of said first visor and said second visor such that said second visor is pivotable relative to said first visor wherein an edge of said second visor remains in contact with said first visor as said second visor is pivoted;
    said second visor being positionable in a stored position such that said forward side of said second visor abuts said front side of said first visor;
    said second visor being positionable in a deployed position having said forward side of said second visor lying on a plane being perpendicular to said front side of said first visor such that said second visor is configured to provide shade for the driver; and
    a window, said window being slidably coupled to said first visor, said window being positionable in a stored position such that said window is concealed within said first visor, said window being positionable in a deployed position such that said window extends downwardly from a bottom edge of said first visor wherein said window is configured to provide additional shade for the driver.

* * * * *